`US005669820A`

United States Patent [19]
Fukushima

[11] Patent Number: 5,669,820
[45] Date of Patent: Sep. 23, 1997

[54] FLEXIBLE PLATE FOR TRANSMITTING TORQUE

[75] Inventor: Hirotaka Fukushima, Hirakata, Japan

[73] Assignee: Exedy Corporation, Osaka, Japan

[21] Appl. No.: 572,220

[22] Filed: Dec. 13, 1995

[30] Foreign Application Priority Data

Dec. 15, 1994 [JP] Japan ................... 6-312206

[51] Int. Cl.⁶ ................................ F16D 3/00
[52] U.S. Cl. ................................ 464/98; 192/200
[58] Field of Search ................. 464/98, 99, 100, 464/68; 192/200, 70.16; 74/574, 572

[56] References Cited

U.S. PATENT DOCUMENTS

| | | | |
|---|---|---|---|
| 4,068,749 | 1/1978 | Antrim | 464/98 X |
| 4,079,598 | 3/1978 | Wildhaber | |
| 4,427,101 | 1/1984 | Maucher et al. | 74/572 X |
| 4,997,408 | 3/1991 | Copeland | 464/98 |
| 5,191,810 | 3/1993 | Craft et al. | 192/70.16 X |
| 5,253,740 | 10/1993 | Kohno et al. | 464/98 X |
| 5,323,665 | 6/1994 | Rediker, Jr. | |
| 5,368,146 | 11/1994 | Kohno et al. | 464/98 X |
| 5,465,635 | 11/1995 | Kono et al. | |
| 5,515,745 | 5/1996 | Tsuruta et al. | 192/200 X |

FOREIGN PATENT DOCUMENTS

| | | |
|---|---|---|
| 41 04 739 | 8/1991 | Germany . |
| 44 02 257 | 7/1994 | Germany . |
| 1001538 | 8/1965 | United Kingdom . |

Primary Examiner—Daniel P. Stodola
Assistant Examiner—Eileen A. Dunn
Attorney, Agent, or Firm—Shinjyu Office of Patent Attorneys

[57] ABSTRACT

A flexible plate (3) transmits torque from a crank shaft (4) in an engine to a fly wheel main body (2) while absorbing axial vibration, and includes a first disc element (7) and a second disc element (8). The first disc element (7) is fixed to a distal end of the crank shaft (4). A second disc element (8) has its inner circumferential portion is connected to the first disc element (7), with both being connected to the crank shaft (4) at their respective inner circumferential portions. The outer circumferential portion of the second disc element (8) is longer in the radial direction than the first disc element (7) and is connected to the fly wheel main body (2). The second disc element (8) can be flexibly transformed in axial directions.

10 Claims, 1 Drawing Sheet

FLEXIBLE PLATE FOR TRANSMITTING TORQUE

BACKGROUND OF THE INVENTION

1. Field of the Invention

The present invention relates to a flexible plate, and more particularly, it relates to a flexible plate for transmitting torque from a engine crank shaft to other components while absorbing axial vibration.

2. Description of the Related Art

In a typical motor vehicle, a fly wheel is attached to a distal end of an engine crank shaft, and a clutch disc assembly and clutch cover assembly are attached to the fly wheel. The fly wheel is provided with a frictional surface which opposes the friction facing of the clutch disc assembly. When the friction facing is pressed against the frictional surface of the flywheel, torque from the engine is transmitted to the clutch disc assembly and applied to the transmission of the vehicle.

A disc-like flexible plate has conventionally been used as an element to connect the distal end of the crank shaft with the fly wheel. This type of flexible plate is excellent in rigidity in radial directions and is capable of being flexibly transformed in axial directions. The flexible plate effectively absorbs axial vibration transmitted from the engine.

In the above-mentioned prior art flexible plate, stress concentration tends to occur in the part of the flexible plate which comes in contact with the outer circumference of the end portion of the crank shaft. Hence, the flexible plate must be increased in thickness in that area so as to improve its durability. Such an increase in thickness, however, increases the rigidity of the flexible plate as a whole and prevents it from effectively absorbing axial vibration.

SUMMARY OF THE INVENTION

Accordingly, it is an object of the present invention to permit the flexible plate to effectively absorb axial vibration while preventing the concentration of excessive amounts of stress in the flexible plate.

According to one aspect of the present invention, a flexible plate includes a first disc element and a second disc element, which allows torque to be transmitted from a engine crank shaft to other components while absorbing axial vibration. The first disc element is fixed to the distal end of the crank shaft, and the second disc element has its inner circumferential portion connected to the first disc element and the crank shaft. The outer circumferential portion of the second disc element extends beyond the outer circumference of the first disc element and is connected to other components. The second disc element is capable of being flexed in axial directions.

In another aspect of the present invention, the first disc element has an annular projection, an inner portion of which comes in contact with an outer circumferential edge of the distal end of the crank shaft.

In yet another aspect of the present invention, the flexible plate further includes a first fixing element for fixing inner circumferential portions of the first and second disc elements to the distal end of the crank shaft.

In yet another aspect of the present invention, the first and second disc elements are made of sheet metal.

In yet another aspect of the present invention, the flexible plate further includes a second fixing element for fixing the first and second disc elements to each other.

According to the present invention, when axial vibration from the crank shaft is transmitted to the flexible plate, the second disc element is flexibly transformed in axial directions to absorb the axial vibration. Here, since the inner circumferential portion of the second disc element is connected to the first disc element and the crank shaft, the flexible plate as a whole is highly rigid in its inner circumferential portion. As a result, stress concentration is relieved. Additionally, the first disc element is flexible because its thickness is not increased as a whole, and therefore axial vibration is effectively absorbed.

In the event that the first disc element has an annular projection, the first disc element and the crank shaft are centered accurately with each other.

In the event that the flexible plate further has a first fixing element, the first disc element and the second disc element are integrally fixed to a distal end of the crank shaft.

In the event that the first disc element and the second disc element are composed of sheet metal, their fabrication is simplified, and the cost of fabrication is reduced.

In the event that the flexible plate further has a second fixing element, the first disc element and the second disc element are integral with each other. In the event that the flexible plate has both the first fixing element and the second fixing element, the first fixing element alone works well to fix them together even if the second fixing element is out of order.

Other objects, features, aspects and advantages of the present invention will be apparent from the following detailed description of the present invention when taken in conjunction with the accompanying drawings, in which like reference numerals designate the same or similar parts throughout.

DESCRIPTION OF THE PREFERRED EMBODIMENTS

Figure 1:
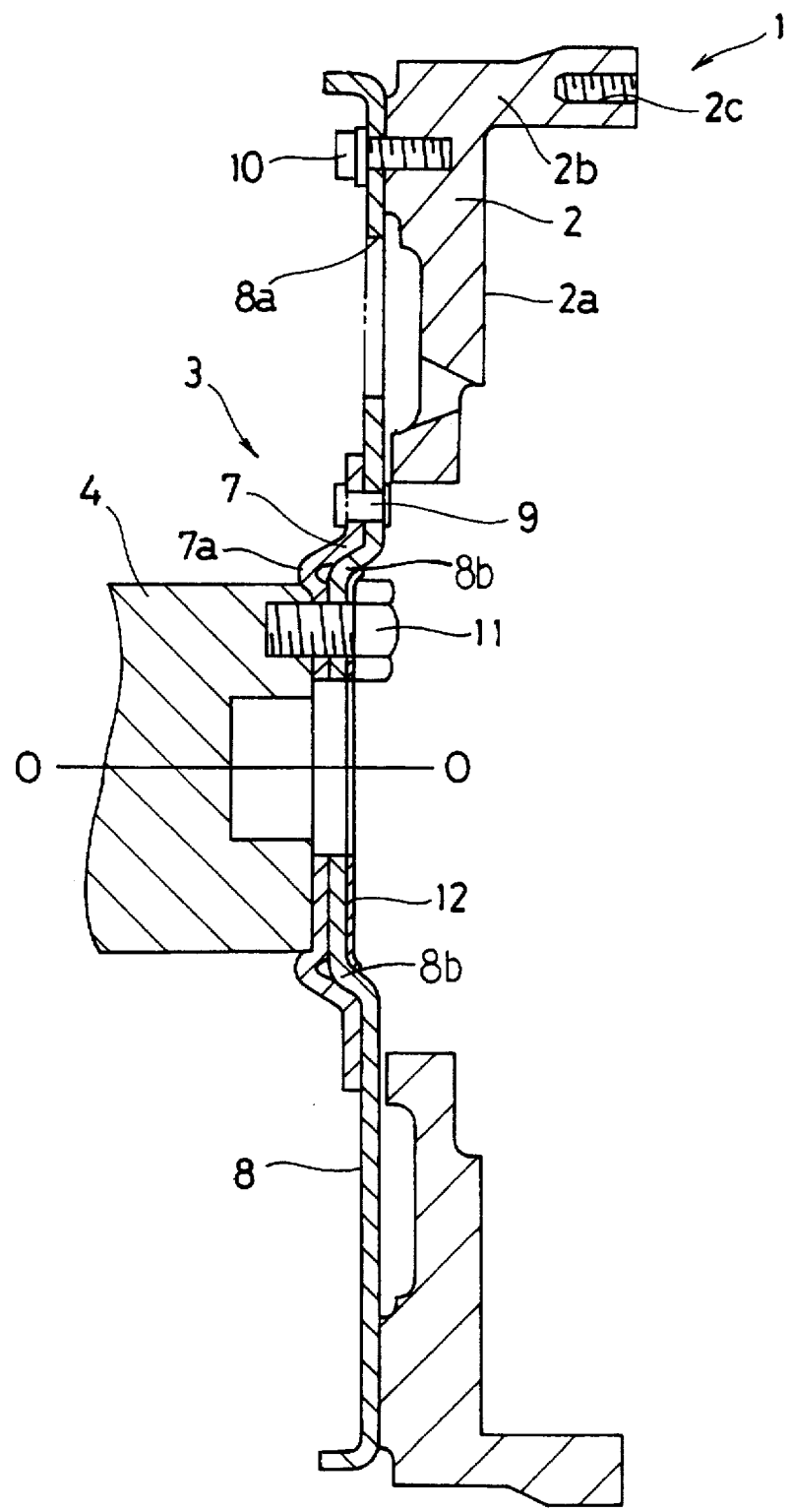
FIG. 1 is a cross-sectional top elevation showing a flexible plate according to a preferred embodiment of the present invention.

FIG. 1 depicts a fly wheel 1 employing a preferred embodiment of the present invention. The fly wheel 1 includes a fly wheel main body 2 and a flexible plate 3, and it is attached to a distal end of a crank shaft 4.

The fly wheel main body 2 is provided with an annular frictional surface 2a. On the right of the frictional surface 2a in the drawing, a clutch disc assembly and a clutch cover assembly are disposed, both of which are not shown. The fly wheel main body 2 has an annular outer circumferential wall 2b extending away from the crank shaft in the axial direction. A bolt hole 2c is disposed in the outer circumferential wall 2b, at which a clutch cover of the clutch cover assembly is fixed.

The flexible plate 3 couples the crank shaft 4 to the fly wheel 2 and is comprised primarily of a first disc element 7 and a second disc element 8. Both the first and second disc elements 7 and 8 are sheet metal disc-shaped components having a center hole. The second disc element 8 is greater in outer diameter than the first disc element 7. The first disc element 7 and the second disc element 8 are fixed to each other in an inner circumferential portion of the second disc element 8 by a plurality of rivets 9. The first and second disc elements 7 and 8 are fixed at their respective inner circumferential portions to the distal end of the crank shaft 4 by bolts 11.

In the first disc element 7, an annular drawing socket 7a is formed, protruding toward the crank shaft 4. The inner portion of drawing socket 7a is in contact with an outer circumferential edge of the distal end of the crank shaft 4. The drawing socket 7a enables the flexible plate 3 to be centered relative to the crank shaft 4. Similarly, the second disc element 8 is formed with a drawing socket 8b that generally corresponds in size and shape to the drawing socket 7a, as shown in FIG. 1.

An outer circumferential portion of the second disc element 8 extends to an outer circumferential portion of the fly wheel main body 2 the second disc element 8 being fixed to the fly wheel main body 2 by bolts 10. In the area on the second disc element 8 located between bolt 10 and bolt 11, a plurality of round holes 8a are formed.

Washers 12 are placed between heads of the bolts 11 and an inner circumferential portion of the second disc element 8.

The operation of the fly wheel will now be described.

Torque is transmitted from the crank shaft 4 to the fly wheel main body 2 through the flexible plate 3. When axial vibration is transmitted to the flexible plate 3, the second disc element 8 is primarily flexed to absorb the axial vibration. The second disc element 8 is the same thickness as the prior art flexible plate, and therefore it is of low rigidity and flexible enough to effectively absorb the axial vibration.

Since the first disc element 7 is fixed to the inner circumferential portion of the second disc element 8, the inner circumferential portion of the flexible plate 3, as a whole, is of high rigidity. Thus, stress concentration in an inner circumferential portion of the flexible plate 3 is relieved. In addition to that, stress concentration by torsional vibration is also relieved in that area.

Moreover, since the drawing socket 7a is formed in the first disc element 7, the flexible plate 3 is accurately centered relative to the crank shaft 4. The first disc element 7 and the second disc element 8 are composed of sheet metal, and therefore their fabrication is simplified and their cost of fabrication is reduced.

Since the first disc element 7 and the second disc element 8 are fixed by the rivets 9, the flexible plate 3 is integral with those components. In addition, the first disc element 7 and the second disc element 8 are fixed by the rivets 9 and the bolts 11, and hence, even if the rivets 9 are damaged, both the elements will still be coupled to each other.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A flexible plate for use with a clutch mechanism, comprising a first flexible disc element configured for connection to a distal end of a crank shaft of an engine, said first flexible disc having an outer diameter greater than that of the distal end of the crankshaft, and a second flexible disc element having an inner circumferential portion thereof connected to said first disc element;

wherein the inner circumferential portion of both first and second disc elements are connected to the crank shaft; and an outer circumferential portion of said second disc element has an outer diameter greater than an outer diameter of said first disc element and said outer circumferential portion is configured for connection to a flywheel.

2. The flexible plate according to claim 1, wherein said first flexible disc element is formed with an annular protrusion such that a portion of said annular protrusion is configured to contact an outer circumferential edge of the distal end of the crank shaft.

3. The flexible plate according to claim 2, further comprising a first fixing element for fixing inner circumferential portions of said first and second disc elements to the distal end of the crank shaft.

4. The flexible plate according to claim 3, wherein said first and second disc elements are composed of sheet metal.

5. The flexible plate according to claim 4, further comprising a second fixing element for fixing said first and second disc elements to each other.

6. The flexible plate according to claim 5, wherein said second fixing element for fixing said first and second disc elements to each other comprises a plurality of rivets circumferentially spaced apart from each other, said rivets extending through a radially outward portion of said first flexible disc element and said rivets extending through a proximate radial mid-portion of said second flexible disc element.

7. The flexible plate according to claim 2, wherein said first flexible disc element is formed with an annular indentation corresponding to said annular protrusion with said annular protrusion on one side of said first flexible plate and said annular indentation formed on an opposite side of said first flexible plate.

8. The flexible plate according to claim 7 wherein a radially inner portion of said second flexible disc element is formed with an annular protrusion that extends into said annular indentation of said first flexible plate.

9. A flexible plate for use with a clutch mechanism, comprising a first flexible disc element configured for connection to a distal end of a crankshaft of an engine, said first flexible disc having an outer diameter greater than that of the distal end of the crankshaft, said first flexible disc element being formed with an annular indentation on one side thereof and a corresponding annular protrusion on an opposite side thereof, a radial inner portion of said annular protrusion being configured to engage an edge of the distal end of the crankshaft;

a second flexible disc element having an inner circumferential portion thereof connected to said first disc element, a radially inner portion of said second flexible disc element being formed with an annular protrusion that extends into said annular indentation of said first flexible plate; and wherein the inner circumferential portion of both first and second disc elements are connected to the crankshaft, an outer circumferential portion of said second disc element has an outer diameter greater than an outer diameter of said first disc element, said outer circumferential portion is configured for connection to a flywheel.

10. The flexible plate according to claim 9, further comprising a plurality of rivets circumferentially spaced apart from each other, said rivets extending through a radially outward portion of said first flexible disc element and said rivets extending through a proximate radial mid-portion of said second flexible disc element.

* * * * *